United States Patent
Mikalsen et al.

(10) Patent No.: US 6,934,948 B2
(45) Date of Patent: Aug. 23, 2005

(54) SYSTEM AND METHOD FOR GROUPING DIVERSE OPERATIONS

(75) Inventors: Thomas Mikalsen, Carmel, NY (US); Isabelle Rouvellou, New York City, NY (US); Stanley Sutton, Chappaqua, NY (US); Stefan Tai, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 09/766,734

(22) Filed: Jan. 22, 2001

(65) Prior Publication Data

US 2002/0099862 A1 Jul. 25, 2002

(51) Int. Cl.[7] ................................................. G06F 9/46
(52) U.S. Cl. ........................................ 718/101; 719/313
(58) Field of Search ................................ 718/100, 101, 718/107, 108; 719/313, 314–316, 320; 717/161; 707/10; 709/100, 101, 201, 207, 221, 314, 315, 316, 320; 345/759

(56) References Cited

U.S. PATENT DOCUMENTS

| | | | | |
|---|---|---|---|---|
| 5,742,778 A | * | 4/1998 | Hao et al. | 345/759 |
| 5,822,593 A | * | 10/1998 | Lamping et al. | 717/161 |
| 5,956,489 A | * | 9/1999 | San Andres et al. | 709/221 |
| 6,167,455 A | * | 12/2000 | Friedman et al. | 709/320 |
| 6,272,515 B1 | * | 8/2001 | Fouquet | 709/101 |
| 6,493,715 B1 | * | 12/2002 | Funk et al. | 707/10 |
| 6,574,656 B1 | * | 6/2003 | Nagaoka et al. | 709/201 |
| 6,640,244 B1 | * | 10/2003 | Bowman-Amuah | 709/207 |

* cited by examiner

*Primary Examiner*—St. John Courtenay, III
*Assistant Examiner*—Van Hoa Nguyen
(74) *Attorney, Agent, or Firm*—F. Chau & Associates, LLC (57) ABSTRACT

A method is provided for managing a group of two or more operations within a software system. The method includes initiating a group context including a sub-context for each operation in the group context, wherein each operation is supported by one of a transactional resource and a messaging component, performing the operations within the sub-contexts, each operation resulting in an outcome, coupling the outcomes within the group context, determining an overall outcome of the group context, and taking at least one action dependent on the overall outcome. The method further includes the step of terminating the group context upon taking one or more actions.

14 Claims, 12 Drawing Sheets

SYSTEM AND METHOD FOR GROUPING DIVERSE OPERATIONS

BACKGROUND OF THE INVENTION

1. Field of the Invention

The present invention relates to software systems that use diverse operations including transactions and messages and, more particularly, to a method and system to group these operations.

2. Description of Prior Art

Software engineering for enterprise-scale systems presents some important challenges. These include the need to integrate diverse software components in a distributed, heterogeneous system environment while ensuring properties such as reliability, salability, evolvability, etc. In recent years, a category of software commonly referred to as middleware has emerged to address these needs. Middleware is connectivity software that defines a standard for different software components to interoperate with each other. Middleware provides basic communication mechanisms between components while hiding any complexities introduced through distribution and heterogeneity of the components. In addition, middleware provides higher-level services to facilitate application software development and to address software quality concerns.

Two principle kinds of middleware are object-oriented middleware (OOM) and message-oriented middleware (MOM), both contribute to the development of reliable software systems. OOM, for example, provides support for software reliability through distributed transactions. Alternatively, MOM provides support for reliable asynchronous communication between distributed components. Both OOM and MOM have evolved individually and independently over the past years, and they have been implemented in the development of many enterprise software systems.

The integration and interoperation of services becomes a concern when using OOM and MOM in the same system. In particular, while transactions and messages are reliable individually, existing middleware does not directly support an equivalent level of reliability for use of OOM and MOM in combination.

OOM can be exemplified by object request brokers (ORB), for example, the Object Management Group's Common Object Request Broker Architecture (CORBA) and component technology (e.g., Sun's Enterprise JavaBeans (EJB)). The software components to be integrated are rendered as distributed objects that offer well-defined interfaces. A synchronous client/server model is the standard communications model between objects.

MOM can be exemplified by message queuing (MQ) systems, for example, IBM's MQSeries and implementations of the Java Message Service (JMS) application program interface. Components integrated by MOM communicate by means of asynchronous message exchange, for example, with message queues as intermediators. Components read or write messages (data) using queues, and the distribution of the messages through the network is the responsibility of the MOM. Thus, the components do not directly interact with each other. Communicating components may be anonymous to each other and are typically decoupled.

Each type of middleware has particular advantages. The object-oriented model of OOM is consistent with the object paradigm commonly followed in modern system development and thus helps to support consistent development processes. OOM further aims to promote extensibility and reusability by strictly separating the interfaces and implementations of a component. On the other hand, MOM is particularly well-suited in cases where a decoupling in time or space is needed or desired. In addition, a multiplicity of communication partners can be supported through multicast notification using MOM. Consequently, OOM and MOM are often used in combination. For example, message queuing may be used to communicate with legacy backend servers, while distributed object calls may be used to communicate with web frontends.

One important approach to software reliability is the use of transactions. OOM object transactions resemble database transactions: a transaction transforms a shared state of a system from one consistent state to another consistent state based on an all-or-nothing execution model. The actions that constitute a transaction are synchronous requests on objects. Support for transaction processing has been successfully introduced with services like the CORBA Object Transaction Service (OTS), and its Java binding JTS and the Java Transaction API (JTA).

MOM also has a notion of transaction. However, MOM transactions are different from OOM transactions. A transaction in MOM refers to the grouping of a set of produced or consumed messages as one atomic unit of work: either all messages that constitute a MOM transaction are sent out and read, or none of the messages are sent out and read.

Figure 1:
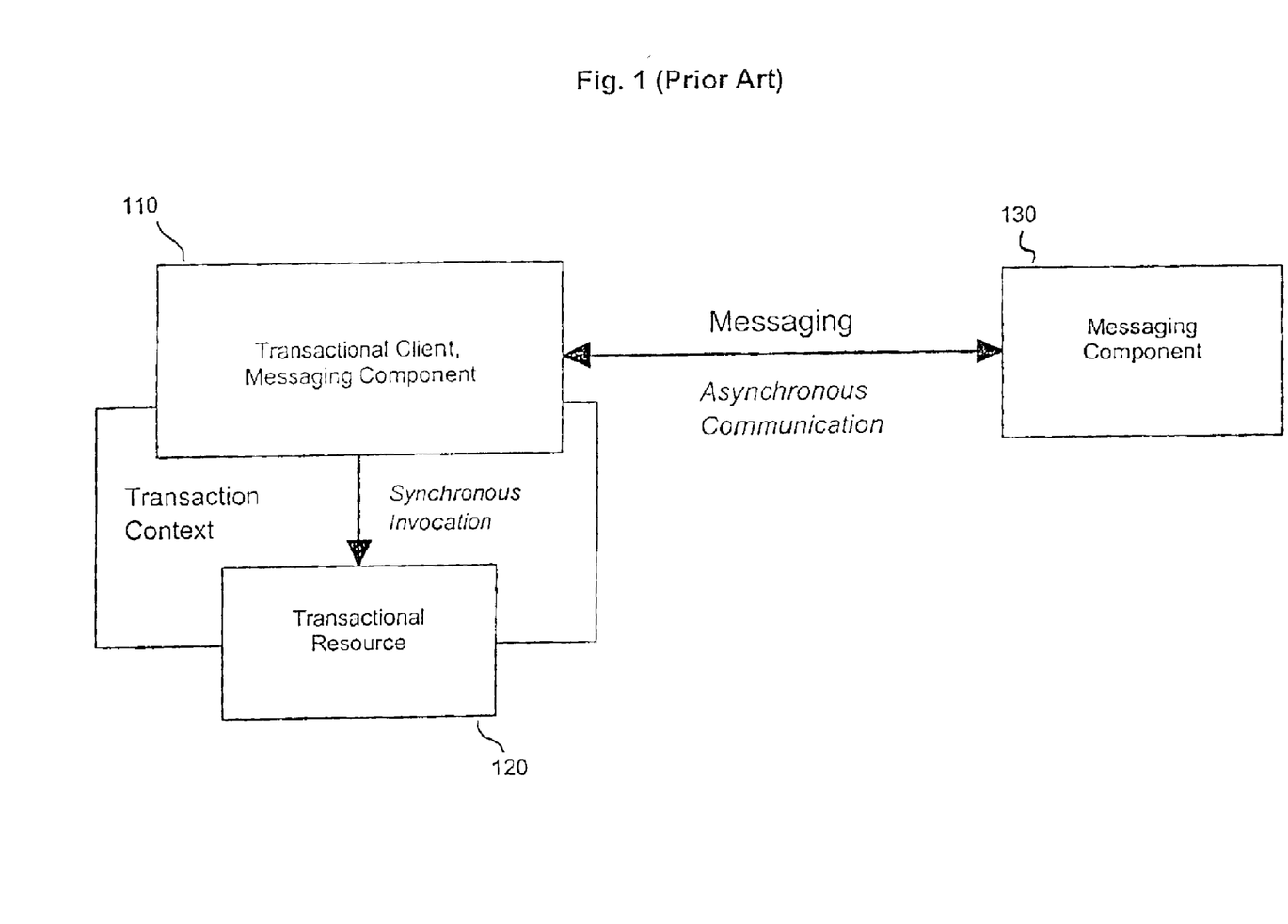
FIG. 1 illustrates a software system that uses transactions and messages as two different kinds of operations in an uncoupled way.

Referring to FIG. 1, a software system using transactions and messages is shown. The system includes a component 110 including both a transactional client and a messaging component. The system also includes a transactional resource 120 and a messaging component 130. Component 110 performs synchronous invocations on the transactional resource 120 within a transaction context. Independent of this transaction context, component 110 communicates asynchronously with the messaging component 130. The system depicted in FIG. 1 is a system illustrating a software system architecture common to existing transaction and messaging systems. A transaction involving one or more transactional resources is independent of any message exchanged between one or more messaging components. Component 110 uses transactions and messaging in an uncoupled way. Therefore, no properties are observed for the operations as a group.

Existing approaches to grouping operations into larger units to ensure certain properties are limited in that support is only provided for grouping of operations of a homogeneous kind. For example, database or object transactions only support the grouping of synchronous requests on transactional resources. Alternatively, messaging units of work only support the grouping of messages. Thus, operations of a heterogeneous kind are not dependent on each other in a group.

There is no known support for grouping diverse operations. As a consequence, software architects need to separate transactions and messages. Therefore a need exists for a system and method for integrating distribution object transaction processing and asynchronous messaging by grouping diverse operations.

SUMMARY OF THE INVENTION

According to one embodiment of the present invention a method is provided for grouping at least two diverse operations. The method includes the step of initiating a context grouping the operations, wherein the group is one of, at least two messaging operations, and one or more messaging operations and a transactional operation. The method further includes the steps of performing the operations within the context, each operation resulting in an outcome, combining the outcomes, determining an overall outcome based on a combination of the outcomes for each operation, and taking at least one action dependent on the overall outcome. The method also includes the step of terminating the context upon taking the action. Each operation is supported by an object.

The outcome of each messaging operation is independent of other messaging operation outcomes. The outcome of a messaging operation is independent of a transactional operation outcome. An operation is one of a synchronous invocation on a transactional resource and a conditional asynchronous message between two or more messaging components. The synchronous invocation occurs in at least one transaction. The asynchronous message results in an outcome, the outcome defined by a condition associated to a corresponding operation.

The method includes the step of grouping the synchronous invocation in the transaction and the conditional asynchronous message. The method further includes the step of interpreting each outcome as one of a success and a failure. The method includes the step of interpreting the overall group outcome as one of a success and a failure. The method evaluates the overall group outcome as a failure if at least one individual operation is interpreted as a failure.

The action is one of a predefined action, an automatically invoked action, and a performed action. The action taken upon determining the overall outcome to be a failure further includes the step of undoing an operation. The action taken upon determining the overall outcome to be a failure further includes the step of compensating for an operation.

According to an embodiment of the present invention, a program storage device readable by machine, tangibly embodying a program of instructions executable by the machine to perform method steps for grouping at least two diverse operations within an object-oriented software system.

The method including the step of initiating a group context by creating a representation of the context according to a defined data structure, and filling the representation with values that identify the group context.

According to one embodiment of the present invention, a method is provided for managing a group of two or more operations within a software system. The method includes the steps of initiating a group context including a sub-context for each operation in the group context, wherein each operation is supported by one of a transactional resource and a messaging component, performing the operations within the sub-contexts, each operation resulting in an outcome, coupling the outcomes within the group context, determining an overall outcome of the group context, and taking at least one action dependent on the overall outcome.

The method further includes the step of terminating the group context upon taking one or more actions. The step of initiating the group context includes the steps of creating a representation of the context according to a defined data structure, and filling the representation with values that identify the group context.

An operation is one of a synchronous invocation on a transactional resource, an asynchronous message between at least two messaging components, and a second group of at least two operations. The synchronous invocation occurs in at least one transaction. The asynchronous message results in an outcome, the outcome defined by a condition associated to a corresponding operation.

The method further includes the step of grouping the synchronous invocation on the transactional resource and a conditional asynchronous messaging. The method interprets each outcome as one of a success and a failure. The method further includes the step of interpreting the overall group outcome as one of a success and a failure. The method includes evaluating the overall group outcome as a failure if at least one operation is interpreted as a failure. The action can be one of a commit, a rollback, and a compensation. The action can be one of an update, a delete, a make-table, and an append. The action taken upon determining the overall outcome to be a failure further includes the step of undoing an operation. The action taken upon determining the overall outcome to be a failure further includes the step of compensating for an operation.

Managing the group includes one of achieving a defined property of the software system and preserving a defined property of the software system. The outcome of each messaging operation is independent of other messaging operation outcomes. The outcome of a messaging operation is independent of a transactional operation outcome.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 2:
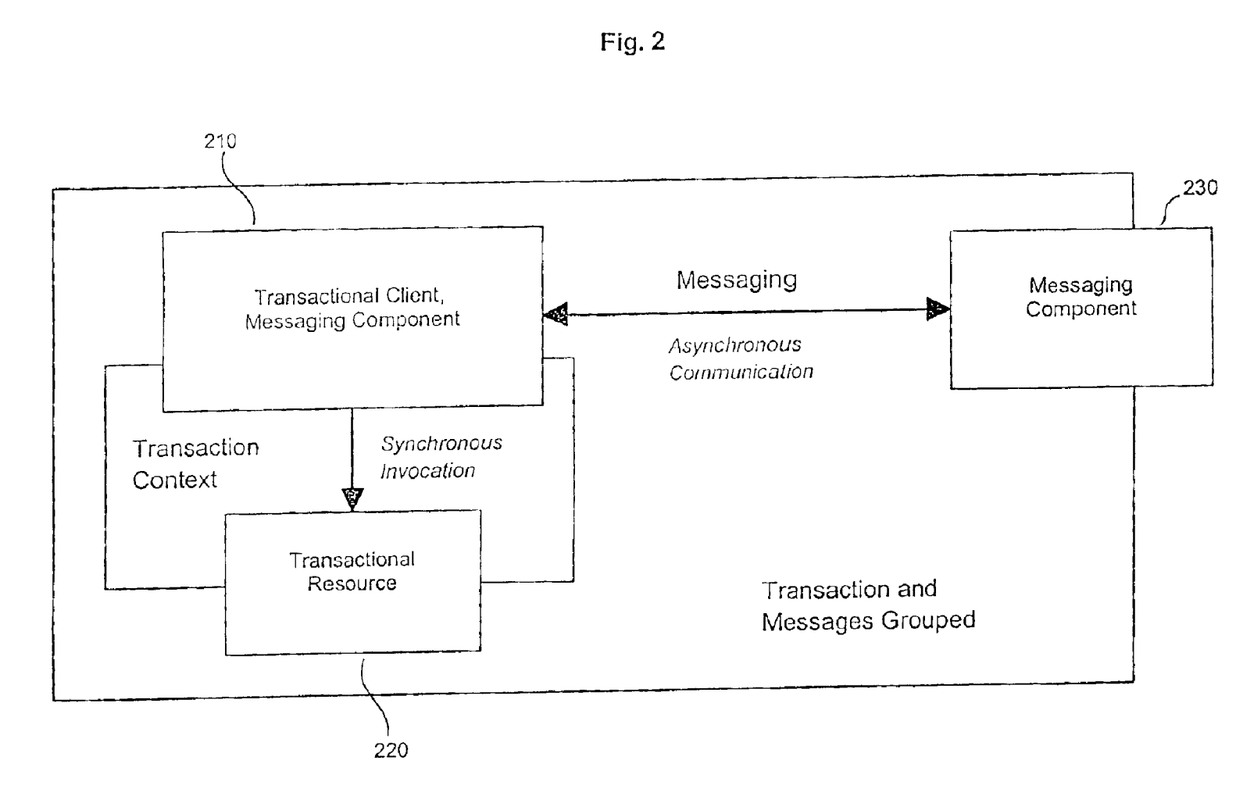
FIG. 2 illustrates a software system where synchronous transactional invocations and asynchronous messages are performed dependently according to the present invention.

The present invention relates to a system and method of managing at least two diverse operations to achieve and/or preserve a defined property. Referring to FIG. 2, the system includes a component 210 that is both a transactional client and a first messaging component. The system also includes a transactional resource 220 and a second messaging component 230. The system performs transactions and messaging in a coupled way within a combined transaction and messaging context (the group context) in order to achieve or preserve a property. For example, a transactional workflow object needs to send out notification messages asynchronously (non-blocking) to multiple components using message queuing and also needs the successful delivery of those messages to final recipients reading from the queues. The distributed object transaction and the notification messages are thus dependent on each other: the transaction will succeed if all notification messages reach final recipients, and if either the transaction or one of the message deliveries fails, appropriate undo-actions will automatically be taken for both. Therefore, properties for the combined operations can be defined and preserved within the context as shown in FIGS. 5 through 12.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system, or part of the operating system itself, or part of the middleware. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
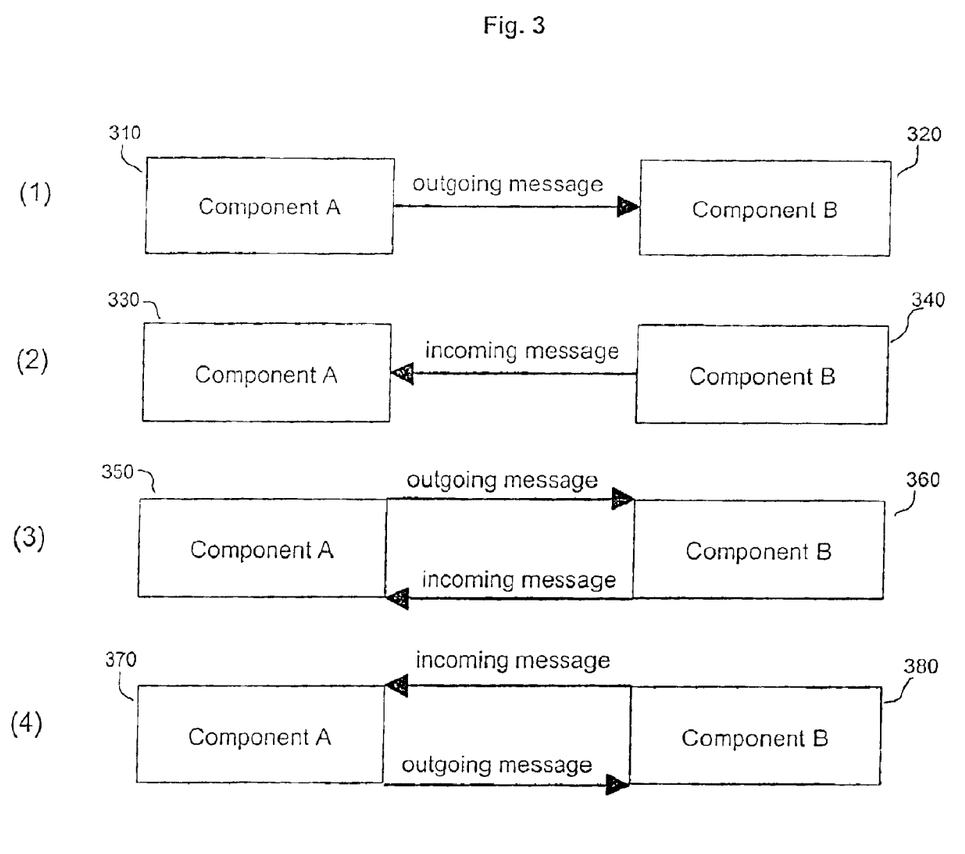
FIG. 3 is a block diagram showing four different component interaction styles of messaging.

FIG. 3 depicts four different messaging interaction styles. Each style involves two or more messaging components. Each component may be a sender, a recipient, a requester, and/or a replier. These roles are assigned to components A 310, 330, 350, and 370 of FIG. 3, respectively.

In the first case (1), the component A 310 sends a message to component B 320. Component A 310 is the message sender producing an outgoing message, and component B 320 is the message recipient. This interaction style illustrates a message delivery. Message delivery will be asynchronous from the sender's perspective in that the sender is independent of the availability and response of the recipient. Synchronous message delivery describes an alternative message delivery model. Note that further variants of this interaction style may involve multiple recipients for one message. Also, any of the message recipients, including component B 320, may remain anonymous to the sender. Multiplicity and anonymity with message exchange are supported by the messaging system used for sending messages.

The second case (2) illustrates component A 330 receiving a message from component B 340. Component A 330 is the message recipient of an incoming message, and component B 340 is the message sender. This interaction style illustrates a message receipt. The message receipt may be initiated by component B 340 at the time the message is sent, or, it may be initiated by component A 330 at the time component A 330 decides to receive incoming messages. In the latter case, an intermediary message store holding incoming messages, such as a message queue, may be used.

The third case (3) depicts component A 350 sending an outgoing message to component B 360 and subsequently receiving an incoming message from the same component B 360. This interaction style illustrates a request/reply model of messaging. This interaction involves two messages: the first message represents the request, the second message represents the reply to the request message. The two messages are correlated in that the reply message references the request message. The reply message may be a simple acknowledgment of receipt, or may contain results of some processing of component B 360 that was triggered as a consequence to the request message. Assuming that the request message is sent asynchronously, component A 350 can continue its processing after sending the request, the component is not blocked waiting for the reply.

In the fourth case (4), the reverse messaging interaction style of (3) is shown. Component A 370 first receives an incoming asynchronous message from component B 380, and may perform some processing as a consequence of this incoming message, and component A 370 later sends an outgoing message to the component B 380.

These four messaging interaction styles may be implemented in a system using transactions and messaging in combination. The transactional client 210 of FIG. 2, for example, may perform any of the messaging interaction styles shown in FIG. 3.

Figure 4:
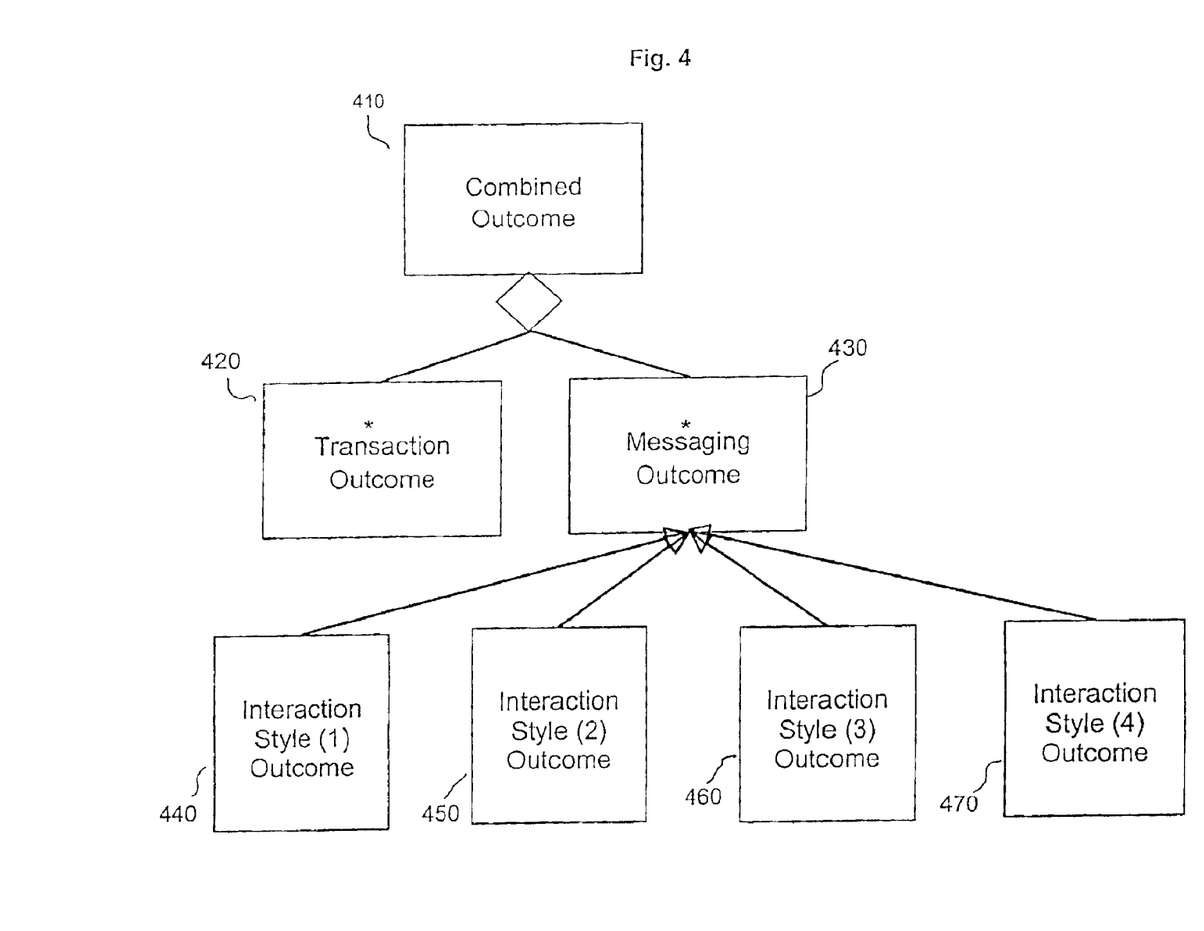
FIG. 4 is a block diagram showing the combination of individual outcomes of messaging operations and synchronous transactional operations can be combined to yield an overall result.

FIG. 4 shows the overall outcome including the various individual outcomes of the diverse operations according to an embodiment of the present invention. The operations are performed within a grouping context and are computed in a software system including a system for grouping transactions and messages. It should be noted that any two messages are considered to be diverse operations. Similarly, messages are diverse from a transaction.

The combined outcome 410 is dependent on the individual outcomes of the different operations performed under an initiated group context. The individual outcomes comprise zero or more transaction outcomes and one or more messaging outcomes. 420 is the outcome of a synchronous invocation performed under the initiated context (see FIG. 2). 430 is the outcome of a messaging interaction performed under the initiated context. The messaging interaction outcome can be of any of the types shown in 440, 450, 460 and 470 corresponding to messaging styles 1, 2, 3, and 4 of FIG. 3 respectively. The individual outcomes depicted in FIG. 4 are to be understood in the context of a system that uses dependent transactions and messaging.

Figure 5:
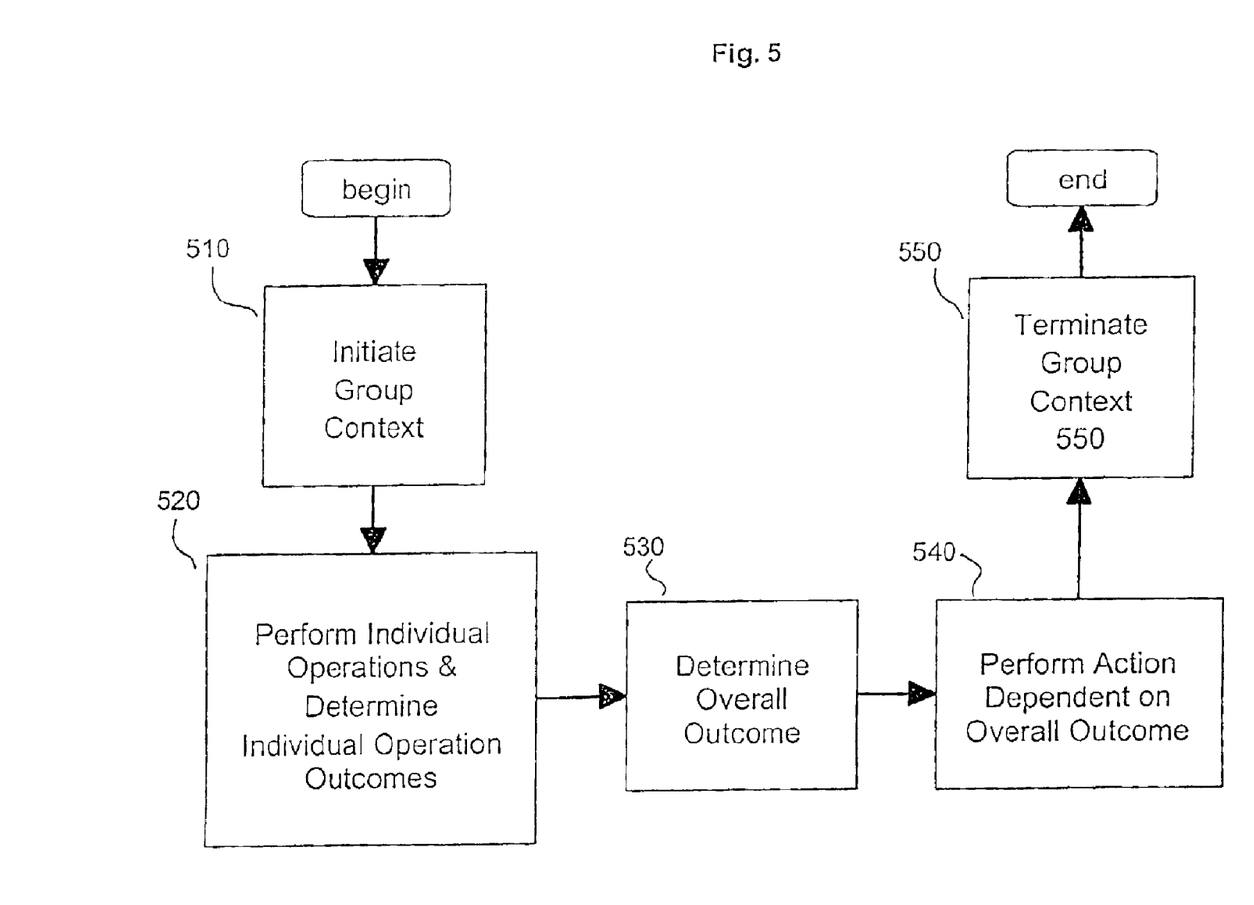
FIG. 5 is a block diagram showing a method for achieving or preserving defined properties of a group of operations.

FIG. 5 shows a method for achieving or preserving defined properties of a group of operations. Properties may be related to, for example, atomicity, consistency, visibility, persistence, compensation, versioning. In addition, these properties can be defined based on, for example, language, system, installation, application.

Atomicity refers to a context that succeeds or fails as a whole. Success therefore, may be defined as the completion of all requests and the delivery of all messages. Thus, if any individual synchronous request or asynchronous message within the context is not successful then the context must fail as a whole.

Another property can include consistency. Object transactions (synchronous requests) transform a system state from one consistent state to another consistent state, as the input to the transaction is guaranteed to be the output of a previously committed transaction. Consistency of system state is application defined data integrity. At the point in time that a transaction commits, the system state conforms to the defined data integrity. According to one embodiment of the present invention, consistency can also refer to messaging. At the point where a transaction commits, the system state conforms to the defined data integrity and may have any number of messages delivered as part of the context.

Still another example of a property is durability. Durability can be achieved within a context by declaring messages to be durable, whereas synchronous object requests are typically durable. Thus, once a context commits, all of the requests, e.g., updates, as well as any message deliveries, are made durable.

Referring to FIG. 5, in block 510, a group context is initiated. Initialization creates a representation of the context according to a defined data structure and fills the representation with values that uniquely identify the group context. There are different types of data structures, these can include, for example, lists, trees, arrays, sets and bags. The group context represents the overall group of operations for which some set of defined properties are to be achieved or preserved. Such a context is similar to, for example, a transaction context as established for transactions by transaction processing systems. A transaction context defines a scope, inside of which operations on transactional resources occur, in order to ensure properties such as atomicity and isolation.

Depending on the type of operations to be grouped, block 510 may entail the initiation of additional, subsidiary contexts and the association of these to the group context. For example, where the context initiated in block 510 is intended to group synchronous requests that are made as part of a transaction, a transaction context may be initiated and associated to the group context. Alternatively, where the context established in block 510 is intended to group messaging operations, then a messaging context may be initiated and associated to the group context. If both transaction and messaging operations are to be grouped, then both transaction and messaging contexts may be initiated and associated to the group context.

The initiation of a group context in block 510 typically leads to the creation or adoption of a representation of the context and to other representations, such as operation logs, that are used in managing the context. For example, objects may be created to represent the group context created in block 510 as well as any transaction or messaging contexts that are associated to the group context. If a transaction context is associated to the group context in block 510, then a new transaction log may be created or an existing log adopted; similarly, if a messaging context is associated to the group context in block 510, then a new messaging log may be created or an existing log adopted. If both transaction and messaging contexts are associated with the group context in block 510, then objects and logs to represent and manage both transaction and messaging contexts may be created or adopted. Representations of contexts, logs, and other information may be used in conducting the group context and the operations that it groups, in evaluating the overall outcome of the context, and in additional operations, dependent on the overall outcome, that serve to achieve or preserve desired properties.

In block 520, operations are performed within the context and individual outcomes associated with each of these operations are determined.

In block 530, the overall outcome is determined by combining the individual outcomes of operations performed within the context. The overall outcome might be, for example, a simple discrete binary outcome, such as "success" or "failure", or a more complex outcome. The technique used to combine individual outcomes can be predefined, or dynamically selected, and it can also be application specific or application independent. Block 530 can be executed in parallel with block 520.

In block 540, an action is taken dependent on the overall outcome and the operations performed within the context, such that certain properties associated with the group are preserved or achieved. Such an action may be a simple action or a complex action including multiple simpler actions.

In block 550, the context is terminated, and the grouping of operations that achieves or preserves some defined property or properties is ended.

Figure 6:
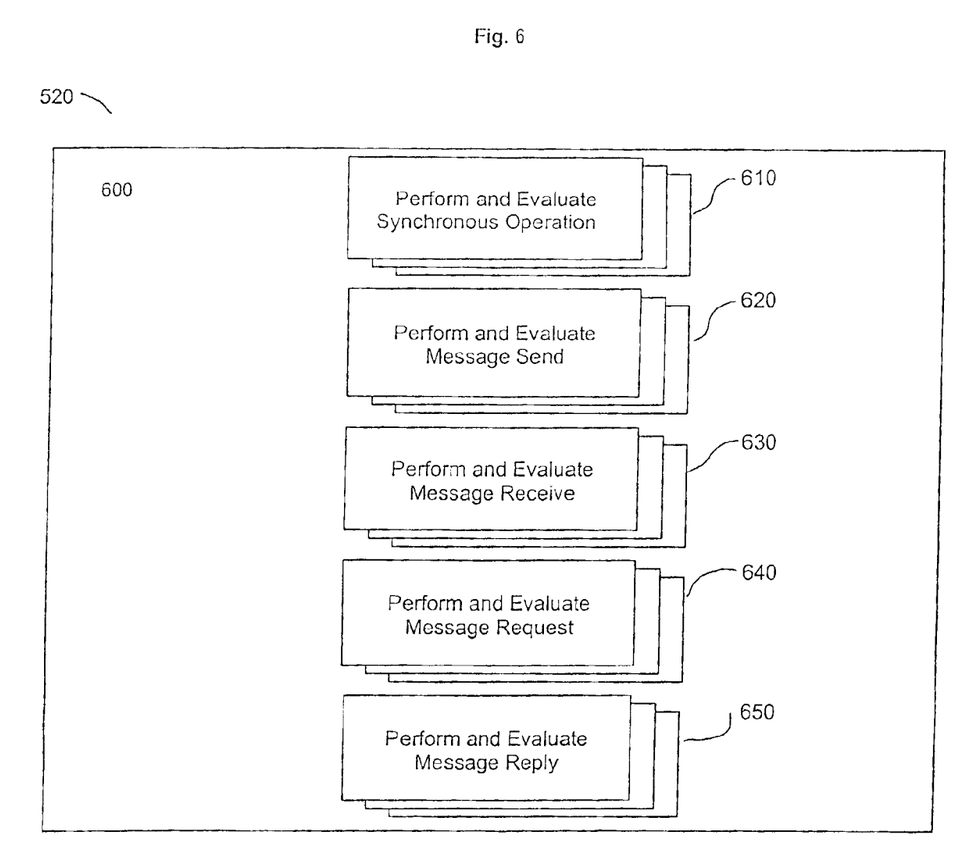
FIG. 6 is a block diagram showing a variety of processes for executing an individual operation and determining the outcome of that operation.

FIG. 6 depicts a variety of operations that may be performed in block 520 (FIG. 5). Blocks 610 through 650 are shown in FIGS. 7 through 11 respectively, include the performance of individual operations and the evaluation of the respective outcomes of those operations. The operations include synchronous operations on transactional resources (610, shown in FIG. 7) and various kinds of messaging operations (e.g., blocks 620 to 650, shown in FIGS. 8 through 11). Any of these blocks may be included or omitted in the execution of block 520. Any included blocks may be performed one or more times, in sequence or in parallel. Block 520 may be terminated based on the individual outcomes of one or more of the described operations as evaluated in blocks 610 to 650, or block 520 may be terminated based on considerations independent of these operations and their outcomes. The termination of block 520 at least implies that no more operations may be initiated within it, and it may entail the termination of any ongoing operations that were previously initiated within it.

Figure 7:
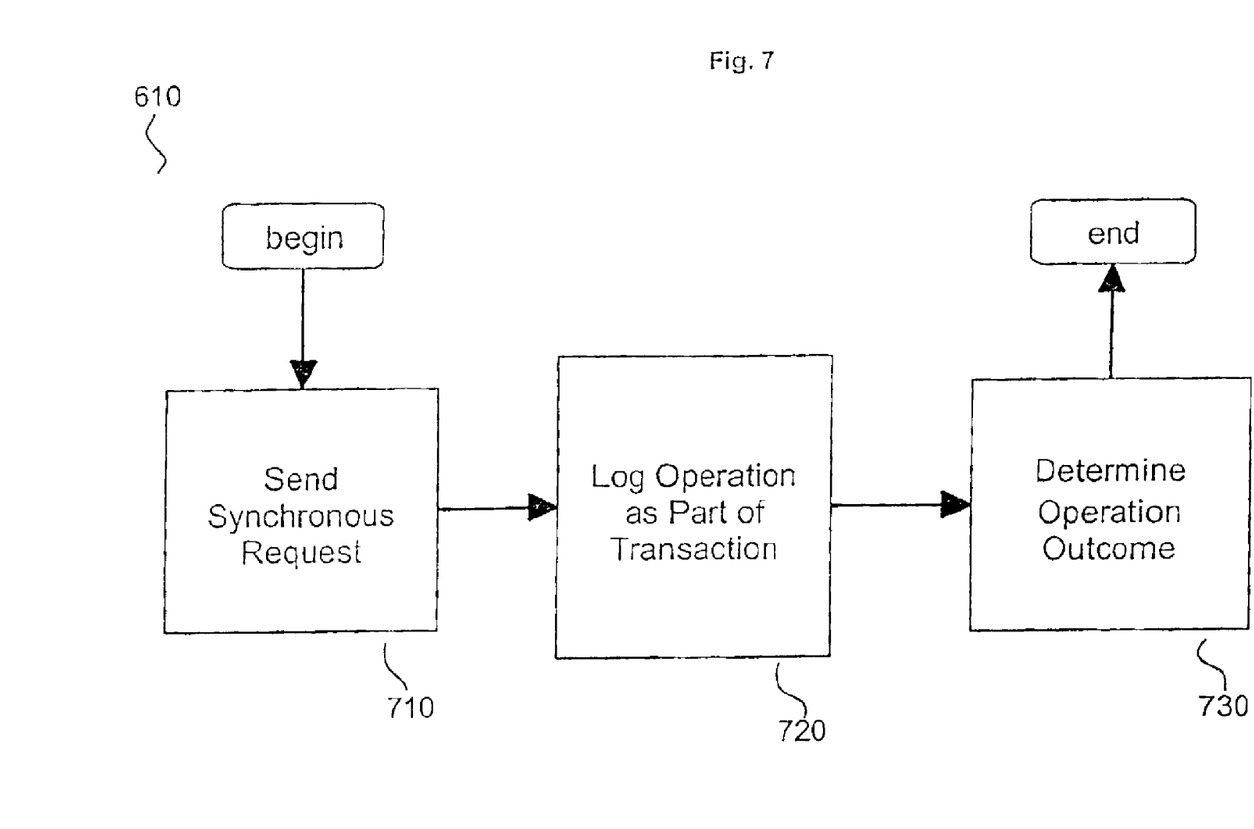
FIG. 7 is a block diagram showing the process of invoking a synchronous request as part of a transaction and determining the outcome of that request, as shown in FIG. 6.

FIG. 7 presents an elaboration of block 610 (FIG. 6) in which the operation is a synchronous request that is made as part of a transaction. If such operations are grouped with other operations according to the present invention, then the context of the transaction to which the synchronous requests belong is established as part of the grouping context created in block 510 (FIG. 5). When the transaction context is created, likewise a persistent transaction log must be created or adopted and associated to the transaction in the grouping context. In block 710, a synchronous request is made on a transactional resource. This operation is made within the grouping context established in block 510. In block 720, that operation is logged as part of the current transaction, using the log associated to the transaction in the grouping context. In block 730, the outcome of the individual operation is determined. The outcome can be evaluated as "success" or "failure", although other simple or more complex outcomes may be considered. Blocks 720 and 730 can be performed in any order or in parallel.

Figure 8:
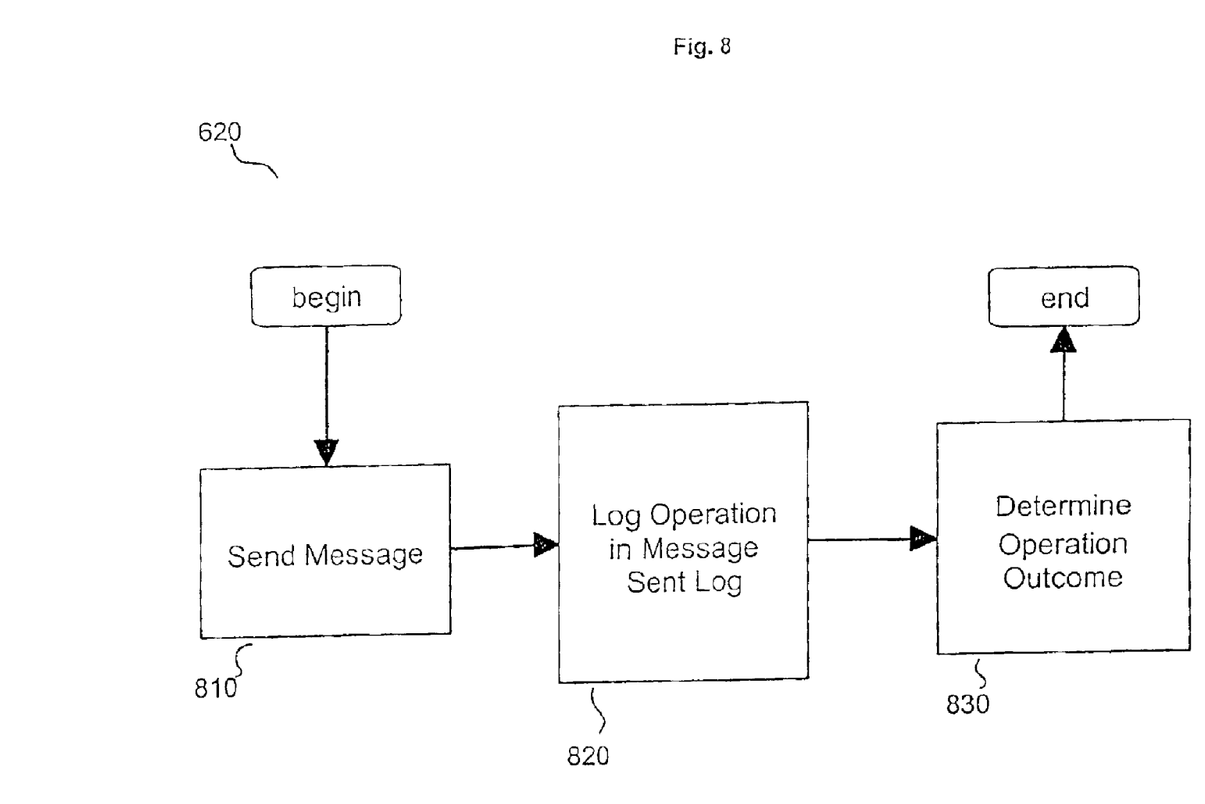
FIG. 8 is a block diagram showing the process of sending a message and determining the outcome of that message send, as shown in FIG. 6.

FIG. 8 presents an elaboration of block 620 (FIG. 6) in which the operation is the asynchronous send of a message. This corresponds to the style of messaging interaction described in the first case of FIG. 3. If such operations are grouped with other operations according to the present invention, then a messaging context is established as part of the grouping context created in block 510 (FIG. 5). A persistent message-sent log is also created or adopted and associated to the messaging context in the grouping context. In block 810 a message is sent asynchronously within the messaging context established with the grouping context. In block 820 the sending of the message is logged in the message-sent log associated to the grouping context. In block 830 the outcome of the message send operation is determined. The outcome may be evaluated as "success" or "failure", although other simple or more complex outcomes may be considered. Blocks 820 and 830 can be performed in any order or in parallel.

Figure 9:
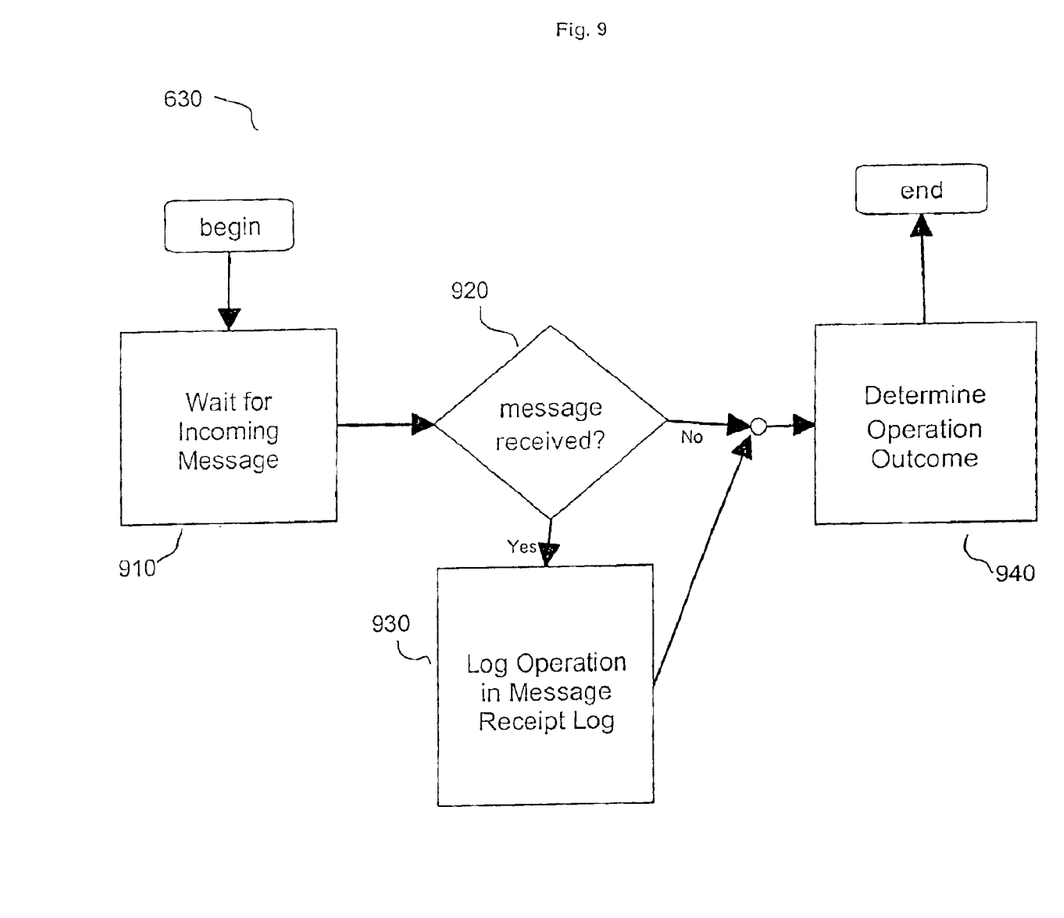
FIG. 9 is a block diagram showing the process of receiving a message and determining the outcome of that message receipt, as shown in FIG. 6.

FIG. 9 represents an elaboration of block 630 (FIG. 6) in which the operation is the receipt of a message. This corresponds to the style of messaging interaction described in the second case of FIG. 3. In block 910 the process waits to receive a message. Block 910 is terminated when a message is received. As shown in FIG. 8, in this case a messaging context is established for the grouping context, and a persistent message-receipt log is created or adopted and associated to the messaging context. Block 910 may also be terminated when a message has not been received, for example, after the expiration of a timeout. In block 920 a determination is made as to whether a message has been received. If a message has been received, then in block 930 the receipt is logged in the associated message-receipt log. Following block 920, if no message has been received, or following block 930, if a message has been received, in block 940 the outcome of the individual operation is determined. The outcome may be evaluated as "success" or "failure", although other simple or more complex outcomes may be considered. Blocks 930 and 940 can be performed in any order or in parallel.

Figure 10:
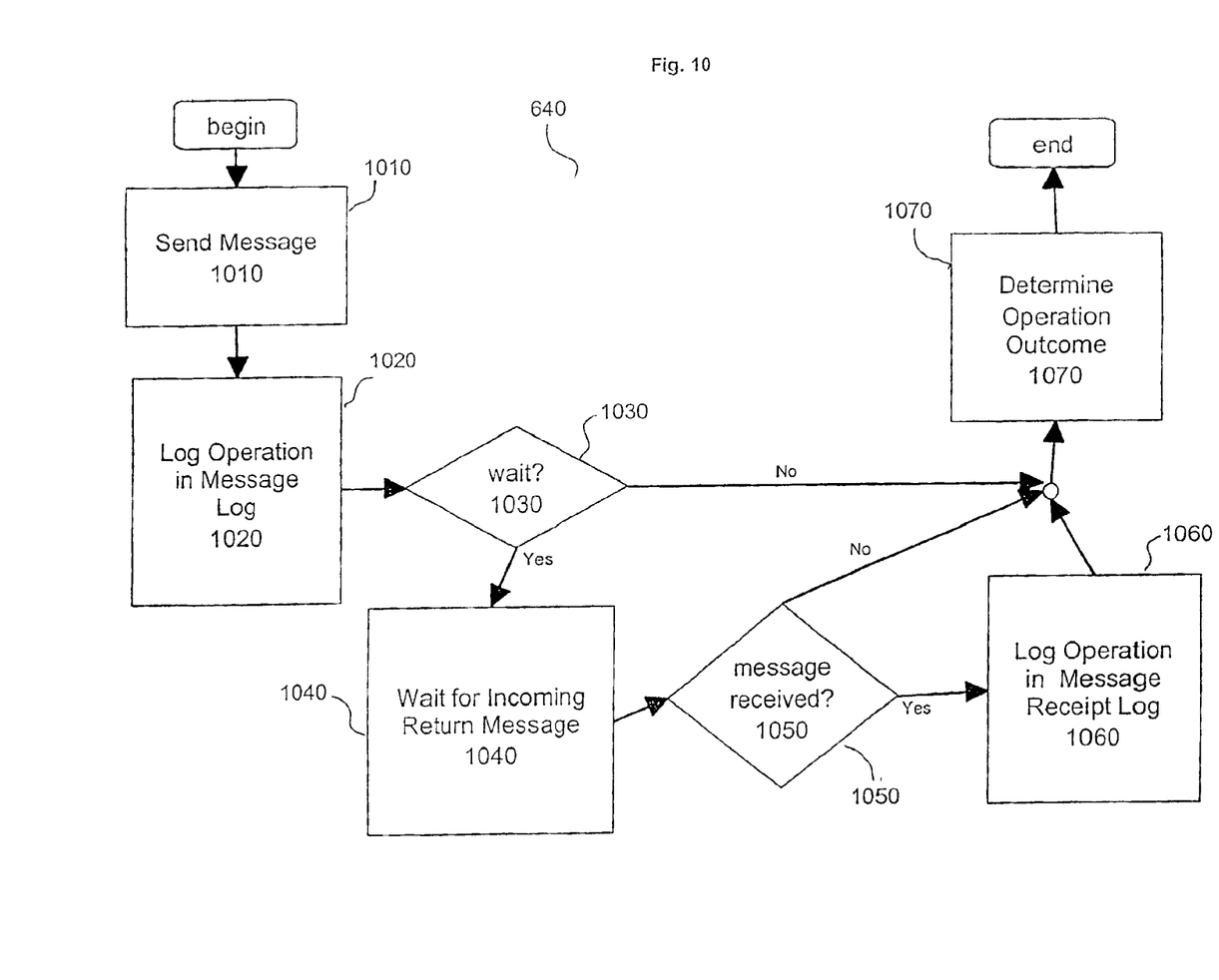
FIG. 10 is a block diagram showing the process of making a request, receiving a reply, and determining the outcome of that request/reply operation, as shown in FIG. 6.

FIG. 10 represents an elaboration of block 640 (FIG. 6) in which the individual operation includes the successive sending and receipt of a message. In particular, this operation corresponds to the role of a requester in a request/reply pattern of messaging, as described in case 3 of FIG. 3. As shown in FIG. 8, in this case a messaging context is established for the grouping context, and a persistent message-sent log is created and associated to the messaging context. In blocks 1010 and 1020 the process sends and logs a message, respectively. In block 1030 the process then decides whether to wait for an incoming message in reply. If a decision is made to wait, then in block 1040 the process waits for a reply message. This waiting may be terminated when a reply message is received or in response to some other condition, action, or event. In block 1050 a control decision is made based on whether a message was received. If a message was received, then this receipt is logged in block 1060. Following block 1030, if a decision has been made not to wait for a reply message, or following block 1050, if no message has been received, or following block 1060, if a message has been received and logged, in block 1070 the outcome of the individual operation is determined. The outcome may be evaluated as "success" or "failure", although other simple or more complex outcomes may be considered. Blocks 1060 and 1070 can be performed in any order or in parallel.

Figure 11:
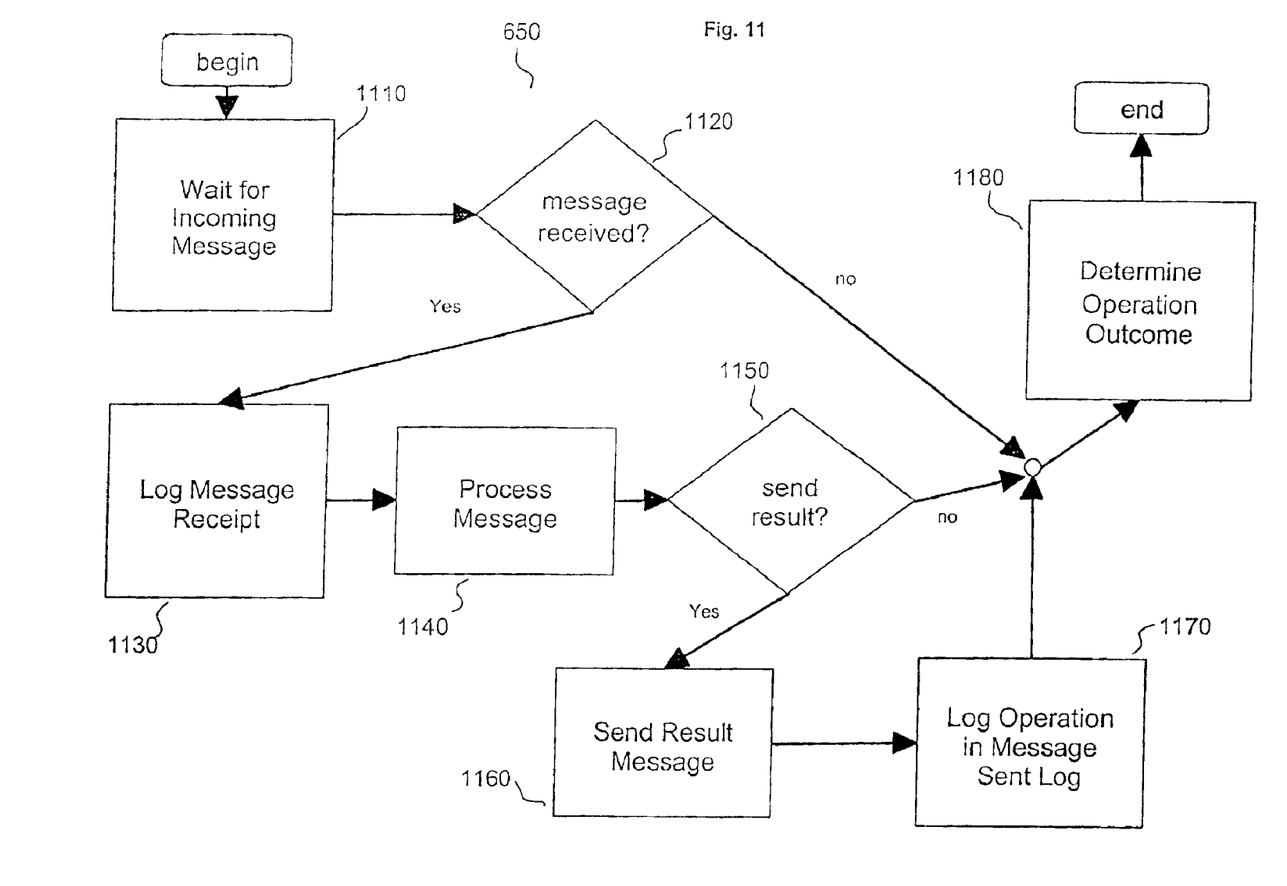
FIG. 11 is a block diagram showing the process of receiving a request, making a reply, and determining the outcome of that request/reply operation, as shown in FIG. 6.

FIG. 11 represents an elaboration of block 650 (FIG. 6) in which the individual operation includes the successive receipt and sending of a message. In particular, this operation corresponds to the role of a replier in a request/reply pattern of messaging, as described in case 4 of FIG. 3. As shown in FIG. 8, in this case a messaging context is established for the grouping context, and a persistent message-receipt log is created and associated to the messaging context. In block 1110, the process waits for a request message. This waiting may be terminated when a message is received or in response to some other condition, action, or event. In block 1120 a control decision is made based on whether a message was received. If a message was received, then this receipt is logged in block 1130. Processing based on the received message is conducted in block 1140. Blocks 1130 and 1140 can be performed in any order or in parallel. Following this processing, in block 1150, a decision is made as to whether to send a reply message in response to the received request message. If the decision is to send a reply, then this reply is sent in block 1160 and logged in the sending is logged in the message log in block 1170. Following block 1120, if no message has been received, or following block 1150, if no reply message is to be sent, or following block 1170, if a reply message has been sent and logged, in block 1180 the outcome of the individual operation is determined. The outcome may be evaluated as "success" or "failure", although other simple or more complex outcomes may be considered. Blocks 1170 and 1180 can be performed in any order or in parallel.

Figure 12:
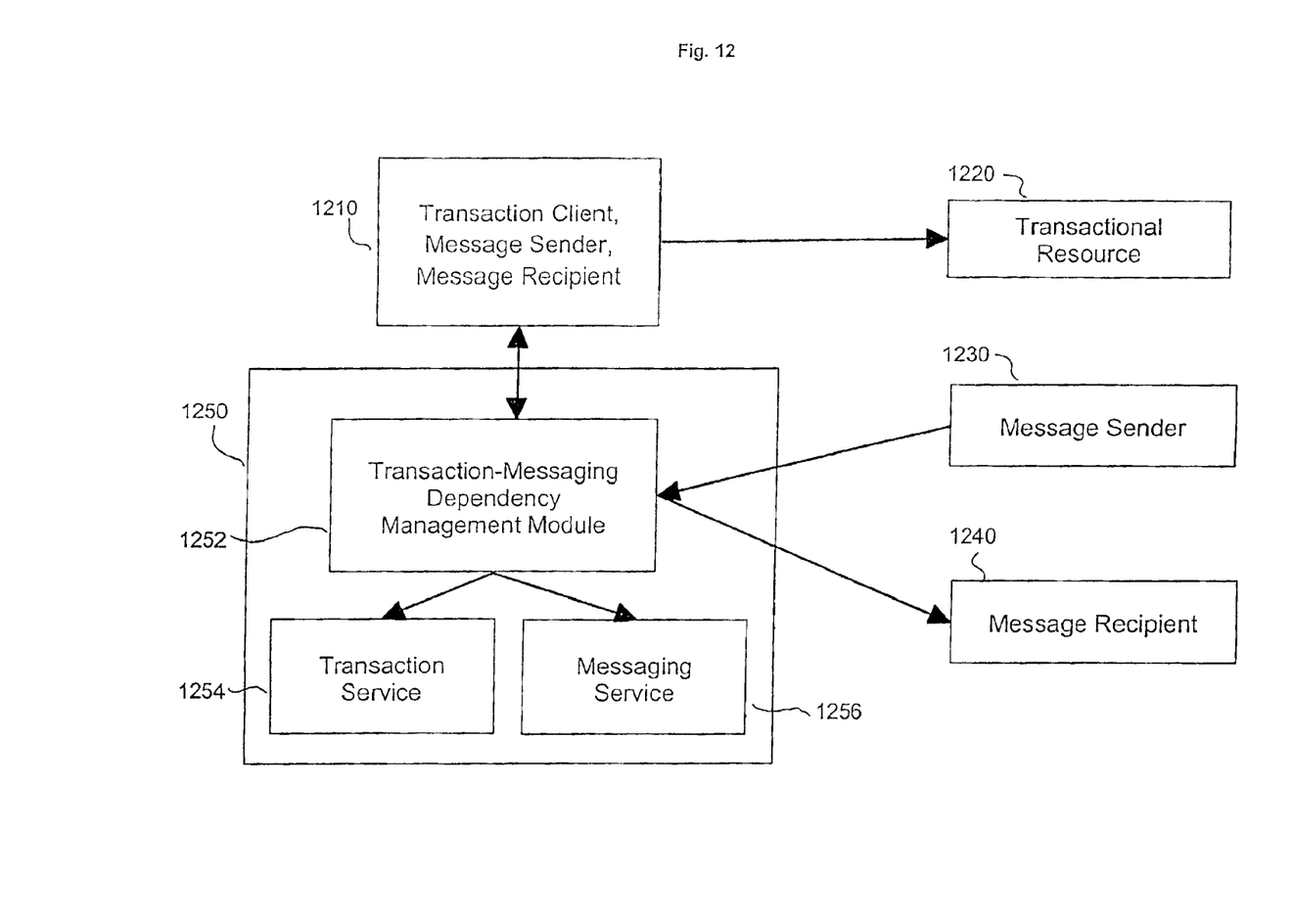
FIG. 12 is a block diagram showing a software system for coupling transactions and messages according to an embodiment of the present invention.

FIG. 12 depicts a software system using a system according to the present invention for coupling transactions and messages according to a method of the present invention. The software system includes the component 1210, which is a transactional client and messaging component that uses transactions and messages in a coupled manner. The component 1210 uses the system of the present invention 1250 for this purpose. The software system also includes the transactional resource 1220, the message sender 1230, and the message recipient 1240. The system of the present invention 1250 includes the transaction-messaging dependency module 1252, the transaction service 1254, and the messaging service 1256.

Component 1210 uses the transaction-messaging dependency module 1252 to initiate the combined context and to terminate the combined context. It may also use module 1252 to abort the combined context. Further, certain operations that are to be part of the combined context may be initiated and performed using module 1252, too. This includes, for example, conditional messaging operations. Module 1252 may also be used for querying purposes to determine individual operation outcomes and overall group outcomes, and to initiate taking actions depending on operation group outcomes.

Synchronous invocations on transactional resources, such as the one illustrated between component 1210 and resource 1220, may not be required to be performed explicitly through the system 1250. Once transactional client 1210 initiates the combined context using system 1250, module 1252 establishes a transaction context using transaction service 1254, and subsequent synchronous invocations by the transactional client on transactional resources are automatically associated with this transaction context. The transactional client can perform operations on transactional resources directly, for those transactional resources that understand the transaction context established by the transaction service 1254 of system 1250.

Messaging operations are preferably conditional messaging operations in order to define and determine individual messaging outcome. Module 1252 uses the messaging service 1256 for actual reliable message deliveries. Message senders, such as message sender 1230 of the software system, and message recipients, such as message recipient 1240 of the software system, may be decoupled from messaging component 1210 through system 1250. That is, message exchange that is part of the combined context is performed entirely through system 1250, in particular module 1252 which in turn uses the messaging service 1256.

System 1250 implements responsibilities described previously as part of the methods of the present invention with reference to FIGS. 7 through 11. Such responsibilities include the logging of the diverse operations in different logs, determining individual operation outcomes, determining the overall operation group outcome, observing and receiving incoming messages, deciding upon the wait for incoming messages (which may include time management and synchronization actions), as well as automatically performing actions in reaction to the operation group outcome to ensure the properties defined for the operation group.

Having described embodiments of a system and method for grouping diverse operations, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for grouping at least two diverse operations, comprising the steps of:

initiating a context grouping the operations, wherein the group is one of at least two messaging operations, or at least one messaging operation and at least one transactional operation;

performing the operations within the context, each operation resulting in an outcome;

combining the outcomes, determining an overall outcome based on a combination of the outcomes for each operation;

taking at least one action dependent on the overall outcome; and terminating the context upon taking the action.

2. The method of claim 1, wherein each operation is supported by an object.

3. The method of claim 1, wherein the outcome of each messaging operation is independent of other messaging operation outcomes.

4. The method of claim 1, wherein the outcome of a messaging operation is independent of a transactional operation outcome.

5. The method of claim 1, wherein an operation is one of a synchronous invocation on a transactional resource and a conditional asynchronous message between at least two messaging components.

6. The method of claim 1, wherein the synchronous invocation occurs in at least one transaction.

7. The method of claim 5, wherein the asynchronous message results in an outcome, the outcome defined by a condition associated to a corresponding operation.

8. The method of claim 5, further comprising the step of grouping the synchronous invocation in the transaction and the conditional asynchronous message.

9. The method of claim 1, further comprising the step of interpreting each outcome as one of a success and a failure.

10. The method of claim 1, further comprising the step of interpreting the overall group outcome as one of a success and a failure.

11. The method of claim 10, further comprising the step of evaluating the overall group outcome as a failure if at least one individual operation is interpreted as a failure.

12. The method of claim 1, wherein the action is one of a predefined action, an automatically invoked action, and a performed action.

13. The method of claim 1, wherein the action taken upon determining the overall outcome to be a failure further comprises the step of undoing an operation.

14. The method of claim 1, wherein the action taken upon determining the overall outcome to be a failure further comprises the step of compensating for an operation.

* * * * *